United States Patent [19]

Duffy

[11] Patent Number: 4,952,350
[45] Date of Patent: Aug. 28, 1990

[54] METHOD FOR FORMING EXPANDED FOAM ROTOMOLDED PRODUCTS

[75] Inventor: Keith Duffy, Johnstown, N.Y.

[73] Assignee: Nelson A. Taylor Co., Inc., Gloversville, N.Y.

[21] Appl. No.: 208,912

[22] Filed: Jun. 20, 1988

[51] Int. Cl.⁵ .............................................. B29C 67/22
[52] U.S. Cl. .................... 264/45.7; 264/45.1; 264/255; 264/311
[58] Field of Search .................... 264/45.1, 45.7, 46.6, 264/255, 310, 311

[56] References Cited

U.S. PATENT DOCUMENTS

| | | | |
|---|---|---|---|
| 3,309,439 | 5/1967 | Nonweiler | 264/46.6 |
| 3,505,137 | 4/1970 | Kliene | 264/45.7 |
| 3,843,285 | 10/1974 | Nitta et al. | 264/45.7 |
| 3,875,275 | 4/1975 | Lemelson | 264/45.7 |
| 3,914,361 | 10/1975 | Shiina et al. | 264/45.7 |
| 3,962,390 | 6/1976 | Mori et al. | 264/45.7 |
| 3,976,821 | 8/1976 | Carrow et al. | 264/45.7 |
| 3,984,511 | 10/1976 | Lammers | 264/45.7 |
| 4,042,663 | 8/1977 | Harder, Jr. | 264/45.7 |

FOREIGN PATENT DOCUMENTS

| | | | |
|---|---|---|---|
| 0160298 | 11/1985 | European Pat. Off. | 264/311 |
| 51-001571 | 1/1976 | Japan | 264/45.7 |
| 51-060254 | 5/1976 | Japan | 264/45.7 |
| 51-106175 | 9/1976 | Japan | 264/45.7 |

Primary Examiner—Jan H. Silbaugh
Assistant Examiner—Allan R. Kuhns
Attorney, Agent, or Firm—Nixon & Vanderhye

[57] ABSTRACT

A method and apparatus for forming a product, and the product, such as a buoy with a plastic outer skin or shell and a plastic foam interior are provided. A first charge including, in one exemplary embodiment, a cross-linkable resin is added to a mold component, followed by a second charge, isolated from the first, and including in the exemplary embodiment expandable polystyrene beads. The apparatus is rotated about two mutually perpendicular axes. Initially, the cross-linkable composition is rotation molded against the walls of the mold to form the outer shell. Thereafter, the second charge of polystyrene beads is released within the mold, at a sufficient temperature to cause expansion of said beads against the shell.

31 Claims, 2 Drawing Sheets

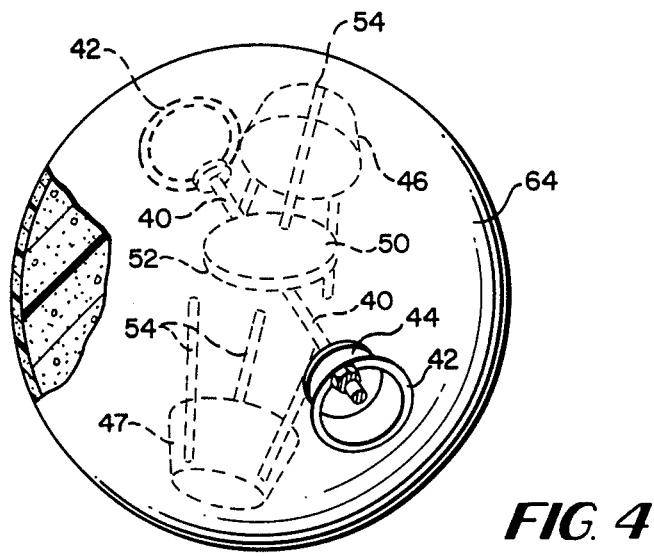
FIG. 4
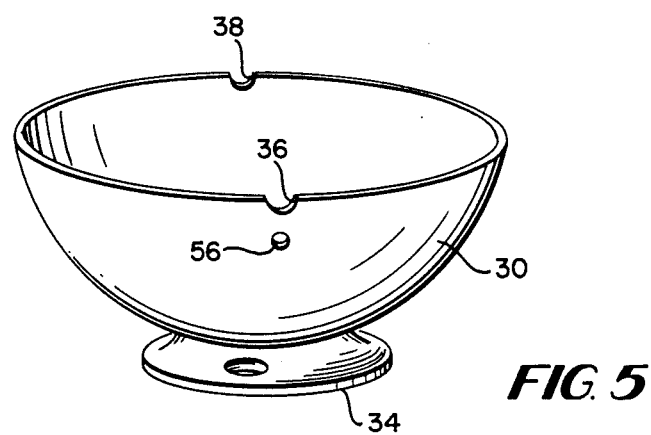
FIG. 5
FIG. 6
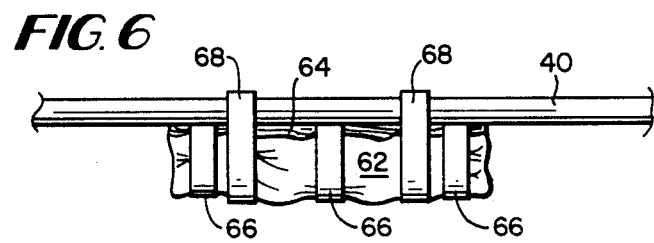

METHOD FOR FORMING EXPANDED FOAM ROTOMOLDED PRODUCTS

BACKGROUND AND SUMMARY OF THE INVENTION

The present invention relates to the production of expanded foam articles, such as buoys and other products where foamed core characteristics are considered desirable or necessary.

More specifically, the invention relates to an improved method and apparatus for forming products, and the products therefrom, including but not limited to buoys and other flotation devices having an expanded foam interior, and a "coating" or exterior shell comprised of a thermoplastic resin. In one exemplary embodiment, a rotomolded buoy is formed, having a polystyrene foam interior core and a cross-linked resin shell.

It is known in the prior art to produce expanded polystyrene foam products, including ring buoys, wherein the product is provided with an integral, protective coating simultaneously with the process of molding the expanded foam interior body portion of the product. For example, in U.S. Pat. No. 3,309,439, a rotatable casting mold is charged with a molding composition comprising expandable polystyrene beads, a hydrate solution, and a resin powder. During rotation casting, the denser resin gravitates outwardly to a position against the mold walls to form an external coating, while the less dense polystyrene beads expand in the interior portion of the mold to form the foamed interior of the product. This technique has not been completely satisfactory however, since good separation between the outer shell or skin and inner foam compositions is not always obtained. The result is an external skin with a splotchy, unattractive appearance caused by mixing, or incomplete separation, of the expandable polystyrene and the resin.

In addition, because the foam charge requires an elevated temperature to cause expansion of the polystyrene beads, outer shell deformation may occur, since most commercially acceptable resins are soft and somewhat pliable at such a temperature. Attempts to solve this additional problem by lowering the temperature have not been successful because there is then insufficient heat to insure optimum expansion of the polystyrene beads.

This invention relates to a method and apparatus which provides an effective solution to the above mentioned problems, and to products produced by the method.

In accordance with this invention, a thermoplastic resin is employed to form the outer shell or skin of a rotomolded product and an expandable resin is employed to form a foam interior. The manufacturing process is carried out in two separate steps wherein the outer skin or shell is rotation cast or molded in an initial step and, after curing of the shell but still at an elevated temperature, a foam charge is released within the mold in a second step, while the mold continues to be rotated. The finished product removed from the mold has been found to have a uniform appearance, with no significant mixing of the shell and foam compositions, and with no deformation or irregularities in the exterior surface of the product.

In carrying out the process of the invention, means are provided for holding and releasing the foam charge within the mold during the rotation casting, or rotomolding, process. The mold itself, which in one exemplary embodiment is spherical in shape, may be of conventional design, with a parting line about the center of the sphere. A conventional mold can be adapted quite easily in certain aspects to accommodate the foam charge holding and releasing means.

Further, the mold can be adapted to accommodate, for example, a cross bar which can be utilized in this invention as a carrier for the foam charge holding and releasing means. The holding and releasing means may include a container or containers, which may be cylindrical, rectangular, or some other suitable shape, and which can be attached to the the cross bar by any suitable, conventional attachment means, such as a bracket, strap, adhesive tape or the like. One or both ends of the container(s) may be provided with a removable lid, which can be secured to the container by a suitable means such as a heat resistant filament-reinforced tape. The tape may extend through a respective slot formed in one of the mold halves to enable the casting machine operator to separate the container(s) and lid(s) without having to open the mold itself. Under certain molding conditions, however, the expansion of the foam charge itself is sufficient to open the container(s).

Alternatively, the foam charge container(s) may comprise a plastic bag(s) which ruptures as the foam charge expands.

In its broader aspects, the invention also relates to a method of forming a rotomolded product comprising the following steps:
  (a) charging a casting mold with a first charge containing a thermoplastic resin composition;
  (b) placing within the casting mold a second charge, isolated from the first charge, the second charge containing an expandable foam composition;
  (c) rotation casting within a heated chamber to cause the resin composition to flow about the mold walls and to fuse thereto as an outer shell;
  (d) after fusion of said resin composition, but while the shell is still heated, releasing the foam charge within the mold for expansion within the heated shell to form the foamed interior.

Utilization of the above described method and associated apparatus provides a high quality product having a smooth and uniform exterior surface, a true exterior shape, and excellent foam core characteristics.

In one specific exemplary embodiment, a flotation device, such as a buoy, may be constructed by the disclosed method and apparatus. The outer shell of the buoy comprises polyethylene containing a cross-linking agent, and the foam charge comprises polystyrene beads. The mold is provided with apertures for supporting a cross bar which protrudes from opposite sides of the mold. The cross bar functions not only to hold the foam charge within the mold, but also to provide ready attachment means for hardware such as mooring rings, on the finished buoy. In this regard, a mooring ring and associated washer may be attached to one end of the cross bar prior to commencing the molding process, and the other ring and associated washer may be attached after the buoy is removed from the mold.

The cross bar in this particular embodiment supports a pair of styrene containers or cups and associated separable lids. More specifically, the lids may be secured e.g., by spot welding, to the cross bar in back-to-back relationship, and the respective containers temporarily held in place with their associated lids by a plurality of strips of fiberglass reinforced adhesive tape.

Subsequent rotation casting within a heated chamber causes the polyethylene composition to flow about the mold walls and to fuse thereto, rendering the polyethylene cross-linked. After fusion of the polyethylene, but while the shell is still heated, the adhesive on the fiberglass tape softens permitting separation of the containers from their respective lids as the mold continues to rotate, thereby releasing the polystyrene beads for expansion within the shell. Upon completion of the forming process, the finished buoy is removed from the mold and mooring ring and washer are fastened to the other end of the cross bar.

It will, of course, be understood that this same basic process can be used to form a number of foamed core products utilizing a number of suitable resin shell and foam core materials. For example, resin shell materials may include polyethylene, polyvinylchloride, polypropylene, nylon, acrylonitrile-butadiene-styrene (ABS), and polycarbonate. In addition, thermoplastics such as polyethylene, polyvinylchloride and nylon which contain cross-linking agents may also be used.

Other objects and advantages of the invention will become apparent from the drawings and detailed description which follows.

BRIEF DESCRIPTION OF THE DRAWINGS

FIG. 4 is a perspective view, partially cut away, illustrating a finished product in accordance with an exemplary embodiment of the invention;

FIG. 5 is a perspective view of a lower half of a spherical mold in accordance with an exemplary embodiment of this invention; and FIG. 6 is a partial side view of an alternative manner of attaching a foam charge within a spherical mold in accordance with the invention.

DETAILED DESCRIPTION OF THE DRAWINGS

Figure 1:
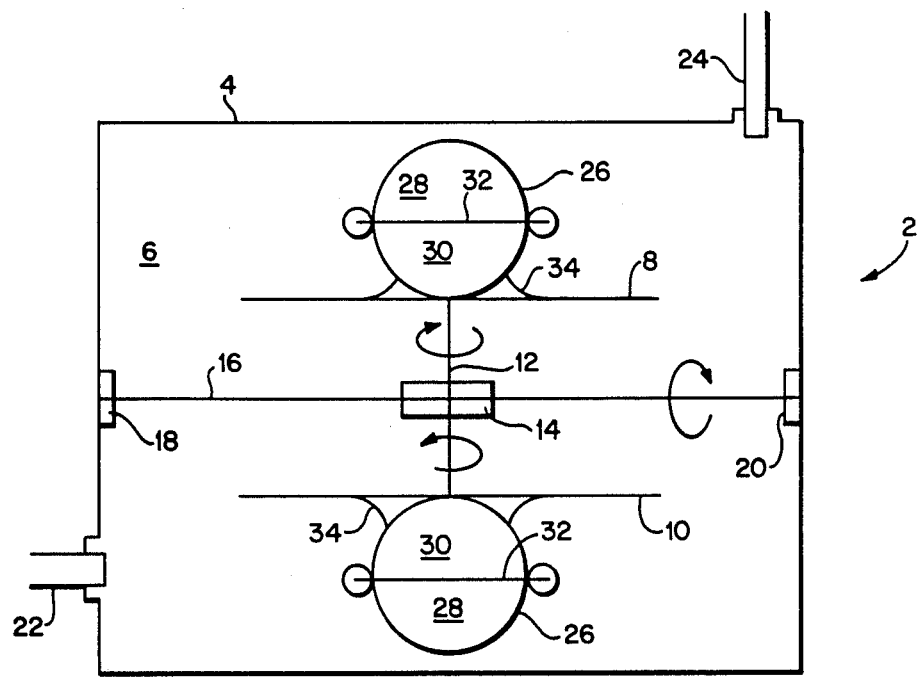
FIG. 1 is a schematic diagram of a rotation casting apparatus, in accordance with the invention, and including a pair of spherical molds mounted therein.

FIG. 1 illustrates an overall schematic diagram of a rotation casting apparatus for use with the subject invention. The rotational casting apparatus 2 includes a housing defining an interior chamber 6, in which are mounted a pair of mold supporting racks 8, 10. It will be understood, of course, that greater or fewer than two racks (with one or more molds per rack) may be disposed in the chamber depending on size of the rotational casting machine, the size of the respective molds, and so on.

The mold securing racks 8, 10 are mounted for rotation about a vertical axis on a shaft 12 which, through a suitable gear box 14, is driven by a horizontal shaft 16 rotatably journaled within the housing at 18 and 20 and driven by means not shown. It will thus be appreciated that the above described arrangement permits the molds to be rotated about two substantially perpendicular axes simultaneously. The casting apparatus further includes a heat inlet 22 and a heat outlet 24.

To this point, the rotational casting apparatus is conventional and is generally of the type disclosed in U.S. Pat. No. 3,309,439. Other conventional rotation casting apparatus may be employed as well.

Each of the rotational casting molds 26 includes an upper part 28 and a lower part 30 separable along a parting line 32. In addition, each mold includes a base portion 34 which provides a convenient mounting surface by which the spherical molds may be attached to racks 8, 10, respectively.

With reference to FIG. 5, it may be seen that each mold half may be provided with diametrically opposed grooves or notches 36, 38, respectively. It will be appreciated that when the upper and lower mold halves are assembled and properly aligned. notches 36, 38 form substantially circular apertures in conjunction with the mating notches formed on the other mold half. The apertures are designed to support a cross bar 40 (FIGS. 2 through 4) which extends through the mold and protrudes beyond either side thereof. When forming a product such as buoy, mooring rings 42 and associated washers 44 may be attached to either end of the cross bar respectively, for anchoring the buoy in a conventional manner. However, during the manufacturing process, it is preferable that only one mooring ring and associated washer be attached at one end of the cross bar, as shown in FIGS. 2 and 3, and the remaining ring and washer may be secured after the forming process is completed.

Figure 2:
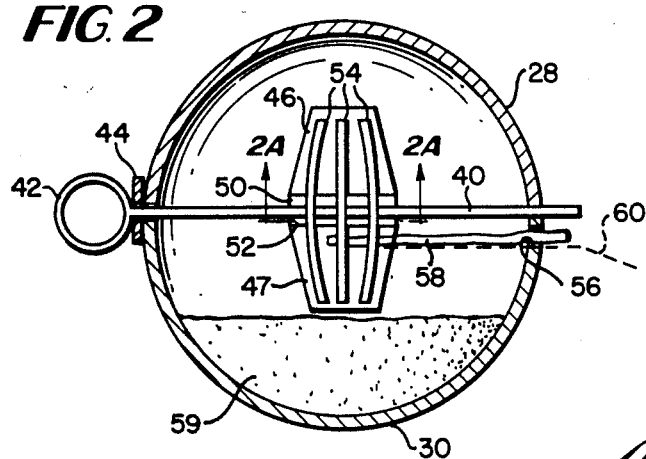
FIG. 2 is a cross-sectional view of a spherical mold in accordance with an exemplary embodiment of this invention, but wherein a base support has been removed.
Figure 2A:
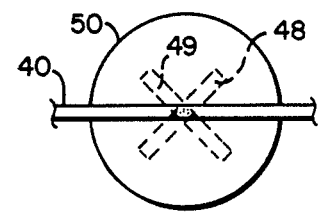
FIG. 2A is a partial section taken along the line 2A—2A in FIG. 2.
Figure 3:
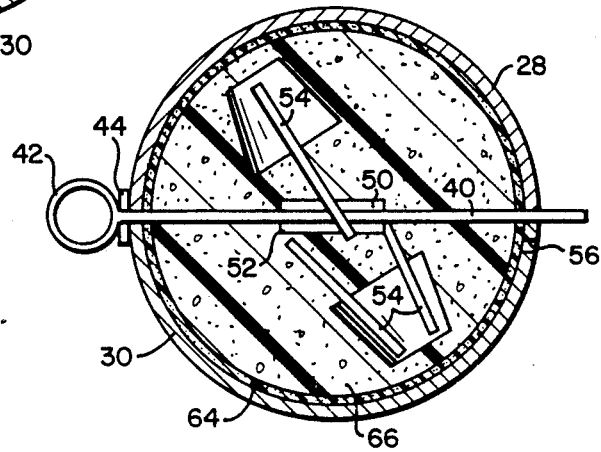
FIG. 3 is a cross-sectional view of a spherical mold as shown in FIG. 2, and illustrating a cast product therein.

With reference to FIGS. 2 through 4, the cross bar 40 supports a pair of containers or cups 46, 47 within the mold by means of brackets 48, 49 or any other suitable connection means. These containers serve as holding and releasing means for the foam charge. The containers, which are preferably constructed of polystyrene, or other suitable material, include lids 50, 52, respectively, which are preferably constructed of polyethylene or other suitable material. The lids are located at one end of each container. Brackets 48, 49 comprise metal strips located on the interior surfaces of the lids, and in this particular embodiment, are spot welded through the lids to the cross bar, as shown in FIG. 2A.

The containers 46, 47 are releasably held to the lids 50, 52, respectively, by suitable means such as one or more strips 54 of filament reinforced adhesive tape, extending across the containers as illustrated in FIG. 2.

The lower mold half 30 is also provided with a venting aperture 56 to allow the escape of steam generated in the foam expansion process. In order to maintain a flow path for the steam during expansion, an elongated strip of flexible material 58, such as steel wool, may extend from container 47 (where it may be releasably held by the tape strips 54) through the aperture 56 as shown in FIG. 2.

In carrying out an exemplary method in accordance with this invention, an open mold half is first charged with a commercially available resin 59 such as polyethylene containing a cross-linking agent. Other suitable resins include polyvinylchloride, polypropylene, polyvinylchloride or nylon, acrylonitrile-butadiene-styrene (ABS) and polycarbonate. As earlier indicated, other suitable thermoplastics such as polyvinylchloride and nylon, also containing a cross-linking agent may be used. Thereafter, the cross bar 40 is placed within the grooves or notches 36, 38 which are diametrically opposed along the parting line of the mold. As previously indicated, when forming a product such as a buoy, the cross bar 40 has attached thereto at one end, the mooring ring 42 and associated washer 44, but the other end remains free, and extends outwardly from the opposite side of the mold as shown in FIG. 2.

A second charge is then attached to the cross bar in the manner described hereinabove, i.e., within a pair of containers 46, 47 held to lids 50, 52 by tape strips 54. This second charge comprises an expandable foam composition which, in this exemplary embodiment, includes polystyrene beads, a hydrate (such as borax) and water.

After the foam charge has been inserted within the mold, the steel wool strip 58 is then fastened to one of the containers and threaded through the venting aperture 56.

The upper mold half is then connected to the lower mold half in a conventional manner. One or more of such spherical molds are mounted on racks 8, 10 within a conventional rotation casting machine 2. The molds are then relatively slowly rotated about axes perpendicular to one another, i.e., 90° degrees apart. Simultaneously, heat is supplied to the interior chamber 6 of the casting apparatus 2 through heating supply inlet 22. As the mold is rotated at the appropriate temperature, the first charge liquifies and fuses about the interior surface of the mold to form the outer shell of the product. As a result of the increased temperatures within the shell, the adhesive on tape strips 54 softens and ceases to hold the containers 46, 47 in closed relationship with the respective lids 50, 52. The containers and lids separate as shown in FIG. 3, releasing the foam charge for expansion against the outer shell.

After the molding has been completed, the product is allowed to cool and the casting mold is then separated about parting line 32 and the finished product removed. In the specific embodiment where the product formed is a flotation device such as buoy, a second mooring ring 42 and associated washer 44 may be attached to the other end of cross bar 40 to complete the assembly. It is to be noted that washer 44 will effectively hide the vent hole 56.

It will be appreciated that other means for holding and releasing the foam charge within the mold may be provided. For example, elongated strips of flexible filament reinforced tape 60 (one of which is shown in phantom in FIG. 2) may be fastened to the containers 46, 47, and extend out of the mold through the venting aperture 56. This arrangement permits the machine operator to manually separate containers 46, 47 from lids 50, 52, respectively, by exerting a pull on the tapes 60. To do this, of course, the mold rotation must be halted momentarily. Nevertheless, this variation provides an effective and reliable means by which the foam charge can be released within the mold. After rotation is resumed, the foam charge is released and the mixture falls to the lower surface of the shell where the water, primarily contained within the hydrate, is released to form steam which uniformly heats the foam beads and causes them to expand in all directions against the shell.

In another alternative embodiment, a flexible plastic bag 62 may be provided to hold the foam charge, as best seen in FIG. 6. In this alternative arrangement, the charge is inserted in the bag, and the open end of the bag may then be rolled down on itself, as shown at 64, and secured by one or more strips of tape 66. At the same time, additional strips of tape 68 are provided to secure the bag to the cross bar 40. Under certain molding conditions, the bag 62 will rupture as the foam charge expands.

FIGS. 3 and 4 illustrate a product formed by the above described method, after removal from the mold, and showing the exterior skin or exterior shell 64 with a foamed interior 66, it being noted that the containers 46, 47 remain within the foamed interior. In the event a plastic bag as shown in FIG. 6 is employed to hold the charge, it will be understood that the ruptured bag also remains within the foamed interior.

FIG. 4 further illustrates a second mooring ring 42 and associated washer 44 fastened to cross bar 40, with washer 44 effectively hiding the venting aperture 56.

It is to be understood that while the process and apparatus has been described with respect to an exemplary embodiment in the form of spherical buoy, the mold and hence the finished product may be formed in virtually any desired shape consistent with the casting processes. Moreover, in addition to buoys, other flotation devices and products which require foamed cores may be made in accordance with the process and apparatus of this invention.

While the above invention has been described in what is presently understood to be its most practical embodiment, those of ordinary skill in the art will understand that many modifications may be made to the subject invention without departing from the spirit and scope of the claims which follow.

What is claimed is:

1. A method of producing a product comprising a thermoplastic outer shell and a foam plastic interior, said method comprising the steps of:
   (a) charging a casting mold with a first charge containing a thermoplastic resin composition;
   (b) placing within the casting mold a second charge, isolated from and supported away from the first charge by mounting support means within the mold and placing the second charge in at least one holding means secured to said support means, said second charge containing an expandable foam composition;
   (c) rotating the mold within a heated chamber to cause said resin composition to flow about the mold walls and to fuse therein as an outer shell;
   (d) after fusion of said resin composition, but while said shell is still heated, said second charge being released within said mold to permit contact of said expandable foam composition with said heated shell to cause expansion of said foam composition within said shell;
   (e) continuing to rotate said mold until expansion of said foam composition is completed; and
   (f) cooling the product and separating it from the mold.

2. The method as defined in claim 1 wherein said resin composition comprises a thermoplastic selected from the group consisting of polyethylene, polyvinylchloride, polypropylene, nylon, acrylonitrile-butadiene-styrene (ABS) and polycarbonate.

3. The method as defined in claims 1 or 2 wherein said resin comprises a thermoplastic selected from the group consisting of polyethylene, polyvinylchloride, and nylon, and further includes a cross-linking agent so that, after fusion of said resin, the latter is rendered cross-linked.

4. The method as defined in claim 3 wherein said resin comprises polyethylene resin powder including a cross-linking agent so that, after fusion of said resin, the latter is rendered cross linked.

5. The method as defined in claim 1 wherein said foam composition comprises polystyrene beads.

6. A method as defined in claim 1 wherein said expandable foam composition comprises polystyrene beads, a hydrate and water.

7. A method as defined in claim 2 wherein said expandable foam composition comprises polystyrene beads, a hydrate and water.

8. A method as defined in claim 6 wherein the hydrate comprises borax.

9. A method as defined in claim 7 wherein the hydrate comprises borax.

10. A method as defined in claim 1 wherein, in steps (c) and (d), the mold is rotated about two, substantially perpendicular axes.

11. A method as defined in claim 1 wherein said product comprises a buoy.

12. A method as defined in claim 11 wherein said buoy is provided with mooring hardware molded in place during steps (c) and (d).

13. A method of producing a flotation device comprising a thermoplastic outer shell and a foam plastic interior, said method comprising the steps of:
   (a) charging a casting mold with a first charge containing a thermoplastic resin composition;
   (b) placing within the casting mold a second charge, isolated from and supported away from the first charge by mounting support means within the mold and placing the second charge in at least one holding means secured to said support means, said second charge containing an expandable foam composition;
   (c) rotating the mold within a heated chamber to cause said resin composition to flow about the mold walls and to fuse therein as an outer shell;
   (d) after fusion of said resin composition, but while said shell is still heated, said second charge being released within said mold to permit contact of said expandable foam composition with said heated shell to cause expansion of said foam composition within said shell;
   (e) continuing to rotate said mold until expansion of said foam composition is completed; and
   (f) cooling the flotation device and separating the flotation device from the mold.

14. The method as defined in claim 13 wherein said resin composition comprises a thermoplastic selected from the group consisting of polyethylene, polyvinylchloride, polypropylene, nylon, acrylonitrile-butadiene-styrene (ABS) and polycarbonate.

15. The method as defined in claims 13 or 14 wherein said resin comprises a thermoplastic selected from the group consisting of polyethylene, polyvinylchloride and nylon, and further includes a cross-linking agent so that, after fusion of said resin, the latter is rendered cross-linked.

16. The method as defined in claim 15 wherein said resin comprises polyethylene resin powder including a cross-linking agent so that, after fusion of said resin, the latter is rendered cross-linked.

17. The method as defined in claim 13 wherein said foam composition comprises polystyrene beads.

18. A method as defined in claim 13 wherein said expandable foam composition comprises polystyrene beads, a hydrate and water.

19. The method as defined in claim 1 wherein step (b) is carried out mounting a cross bar within the mold, by placing the second charge in a container and securing said container to the cross bar.

20. The method as described in claim 19 wherein the container comprises a cup and a lid, and wherein during step (d), the cup and lid separate to release the second charge.

21. The method as defined in claim 1 wherein step (b) is carried out by placing the second charge in a pair of containers and securing said containers to the cross bar.

22. The method as defined in claim 21 wherein each container comprises a cup and a lid and wherein, during step (d), the respective cups and lids separate to release the second charge.

23. The method as defined in claim 1 wherein step (b) is carried out by placing the second charge in a flexible plastic bag and securing said bag to the cross bar.

24. The method as defined in claim 23 wherein, during step (d), the bag ruptures to release the second charge.

25. The method as defined in claim 13 wherein step (b) is carried out by mounting a cross bar within the mold placing the second charge in a container and securing said container to the cross bar.

26. The method as defined in claim 25 wherein the container comprises a cup and a lid, and wherein during step (d), the cup and lid separate to release the second charge.

27. The method as defined in claim 13 wherein step (b) is carried out by placing the second charge in a pair of containers and securing said containers to the cross bar.

28. The method as defined in claim 27 wherein each container comprises a cup and a lid and wherein, during step (d), the respective cups and lids separate to release the second charge.

29. The method as defined in claim 13 wherein step (b) is carried out by placing the second charge in a flexible plastic bag and securing said bag to the cross bar.

30. The method as defined in claim 29 wherein, during step (d), the bag ruptures to release the second charge.

31. The method as defined in claim 1, wherein said support means comprises mooring hardware.

* * * * *